Aug. 12, 1969   A. P. PELLICORE   3,460,272
TEACHING AID

Filed Oct. 24, 1965   2 Sheets-Sheet 1

Inventor
Albert P. Pellicore
By Pendleton, Neuman,
Seibold & Williams
Attys

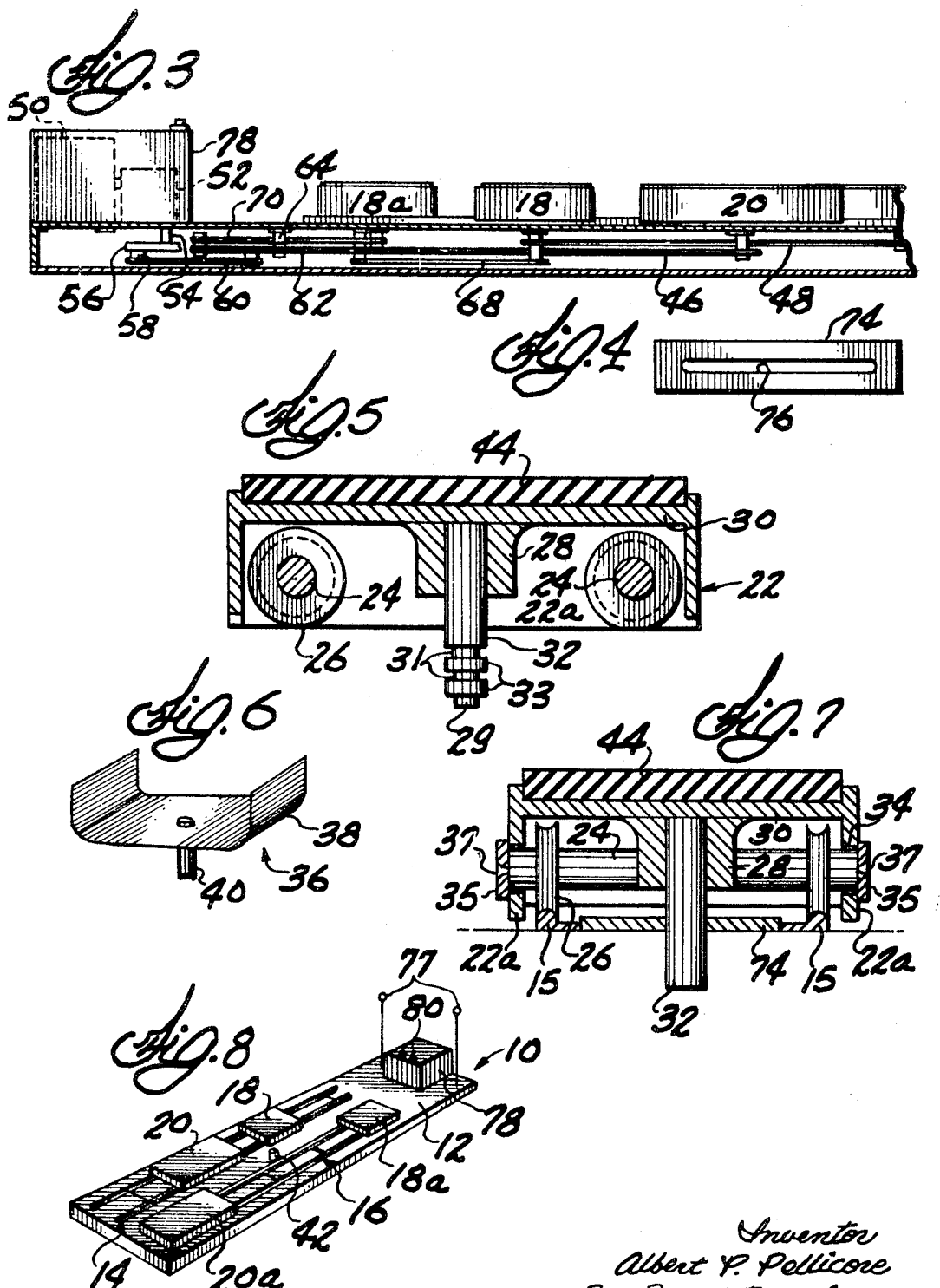

United States Patent Office 3,460,272
Patented Aug. 12, 1969

3,460,272
TEACHING AID
Albert P. Pellicore, 5106 W. Gladys,
Chicago, Ill. 60644
Filed Oct. 24, 1965, Ser. No. 504,528
Int. Cl. A63b *21/00, 23/00;* A61h *1/02*
U.S. Cl. 35—29                                                  5 Claims

ABSTRACT OF THE DISCLOSURE

A device comprising four, substantially coplanar platforms are provided. Said platforms are adapted to supportingly receive a person in a crawling position. The platforms are divided into spaced pairs in axial alignment with diagonally disposed platforms interconnected whereby they may reciprocally move, simultaeously, along axial paths. The device is provided with a cover having slots therein with means projecting through slots to move overlying platforms. A slotted shield partially movable with the platforms is provided between the cover and the platforms to cover the underlying slots.

---

This invention relates to a teaching aid, and more particularly pertains to an aid particulrly adapted to teach a crawling motion to mentally retarded individuals.

It has been found that the development of an ability to crawl in mentally retarded persons is accompanied by a concomitant improvement in the overall mental processes of such persons. It has definitely been established that the reading ability of a retarded individual is augmented by learning the crawling process. Adults who have suffered strokes have been required to crawl as a stimulant to their mental recovery and relearning process. A definite relationship, therefore, has been established between stimulation and activity of the efferent nerves, with resultant muscular motion, and the ability to learn.

The employment of the teaching aid hereinafter disclosed has enabled retarded persons to learn the mechanics of the crawling motion. In addition, the forced movement of the body limbs and resultant muscular activity in the course of simulating a crawling movement has improved the overall mental abilities of the individual utilizing the aid, through a process not yet clearly understood.

The aid hereinafter disclosed is adapted for use with children and adults and may be regulated to afford a desired crawling action appropriate to the degree of retardation of the individual utilizing the same. It will also become apparent from the following description that although composed of a number of moving parts, the disclosed teaching aid may be employed in complete safety by a retarded person, and requires a minimum of attention from nursing personnel.

It is an object of this invention, therefore, to provide a teaching aid which may be used safely to teach a crawling motion to retarded children and adults suffering varying degrees of mental retardation or damage.

It is another object of this invention to provide a teaching aid which occupies a minimum of space and yet allows continuous crawling activity of a person utilizing the same.

The above and other objects of this invention will become apparent from the following detailed description when read in the light of the accompanying drawings and appended claims.

In one embodiment of this invention two sets of spaced, parallel tracks are fixed on a slotted supporting surface. Reciprocally movable over each set of tracks are two supporting platforms. The four platforms are adapted to comfortably and supportably engage the hands and lower extremities of an individual in the position which would normally be assumed in the course of crawling on a supporting surface.

Link means interconnect diagonally opposed platforms which are movable as a unit over the spaced track sets. Drive means, including a driven eccentric and attached link member are connected to the adjacent platforms disposed on the spaced track sets. The drive means reciprocally move the two connected sets of diagonally opposed platforms simultaneously in opposite directions whereby a person supported on said platforms is forced to simulate a crawling action in which the left hand and right leg reciprocally move in opposition to the right hand and left leg.

The drive means portions connected to the movable platforms are disposed beneath the slotted supporting surface through which centrally depending pins of each platform depend. Auxiliary slotted shield members for the movable platforms which are also traversed and driven by the depending platform pins maintain the slots of the underlying supporting surface completely covered at all times preventing accidental injury to an individual using the teaching aid, as will hereinafter be explained in greater detail.

For a more complete understanding of this invention, reference will now be made to the drawing wherein:

FIG. 3 is a fragmentary longitudinal sectional view taken along line 3—3 of FIG. 1;

FIG. 4 is a plan view of a slotted shield utilized in the illustrated teaching aid;

FIG. 5 is an enlarged, longitudinal sectional view of a movable platform member utilized in the teaching aid illustrated in the drawings;

FIG. 6 is a fragmentary perspective view of a supporting member which may be utilized in the teaching aid illustrated in FIGS. 1 and 2;

FIG. 7 is a transverse sectional view taken on line 7—7 of FIG. 2; and

FIG. 8 is a perspective view of the teaching aid of FIG. 1.

Figure 1:
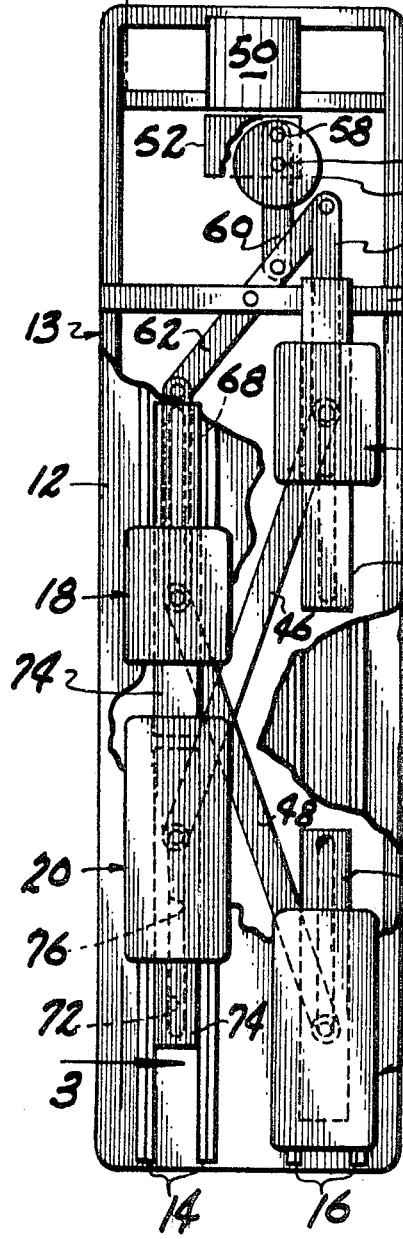
FIG. 1 is a top plan view partially broken away of one embodiment of a teaching aid made in accordance with this invention with the platforms at one extreme of movement.

Referring now to FIG. 8, a teaching aid 10 is illustrated which is particularly adapted to teach children and adults who are mentally retarded to simulate a crawling action. As above explained, it has been found that utilization of the efferent nerves and the resulting muscular motion results in a simultaneous development of the mental capacities and the learning ability of an individual. The teaching aid 10 basically comprises an upper supporting surface 12 on which are disposed spaced sets of track members 14 and 16. Reciprocally movable over track set 14 are a platform 18 adapted to supportably engage the outspread hand of a person in the crawling position and an enlarged platform 20 adapted to supportably engage the knee and remaining lower extremities of an individual who has assumed the normal crawling position. Twin platforms 18a and 20a are reciprocally movable over the track set 16.

Each movable platform is similar in structure to platform 18 illustrated in detail in FIGS. 5 and 7, the hand-engaging platforms being obviously shorter than the knee-engaging platforms. Each platform comprises a main body 22 having vertical wall portions 22a traversed by spaced axles 24 on which flanged wheels 26 are mounted. Depending from an enlarged reinforcing center base 28 extending from the undersurface of top 30 of body 22 is a vertical drive pin 32. It will be noted from FIG. 7 that the axle 24 may be locked to the wheels 26 and the axles may rotate in bearings 34. Retaining plates 35 may be utilized to support the axles 24 in place although other appropriate retainers will function with equal satisfaction. Machine screws 37 hold retainers 35 in place.

In order to closely simulate a crawling motion of a person who is in the normal crawling position and supportably disposed atop the four movable platforms 18, 18a, 20 and 20a, unifying links interconnect diagonally opposed platform members 18a and 20 and 18 and 20a. Depending upon the physical condition of the individual utilizing the aid 10, various supports may be used. In the preferred embodiment illustrated in FIG. 6 a center supporting member 36 has an upper cradle-like portion 38 and a supporting central standard 40. The lower end of the central support 40 is receivable in a socket 42 (see FIG. 8) substantially centrally disposed in the upper supporting surface 12 of the teaching aid 10. If an individual is capable of assuming the normal crawling position without the assistance of the support 36, his two hands will be placed on the smaller platforms 18 and 18a, and the knees and lower extremities will be placed on the larger platforms 20 and 20a. It will be noted from FIGS. 5 and 7 that a cushion 44 is preferably disposed on the top surface of each platform 22 to render the crawling simulation carried out by the illustrated device as comfortable as possible for the person disposed on the platforms.

It will be seen from FIG. 1, in which the upper cover surface 12 has been broken away, that a basic framework 13 supports the cover 12 and the associated mechanism. A unifying link 46 interconnects platform 18a adapted to normally receive the right hand of a person being treated and with platform 20 adapted to normally receive the left knee and lower leg of such person. Unifying link 46 is suitably attached to the lower portions of the depending pins 32 of the two engaged platform members. Each pin may be constructed of a stack of bearings 31 and spacers 33 to receive the appropriate links. The bearings and spacers will be retained by a central bolt 29.

Unifying link 48 similarly interconnects platform 18 adapted to receive the left hand of a person assuming the crawling position on the device 10 and the larger platform 20a normally receiving the right knee and lower leg of a person being taught to crawl.

Motive means comprising a motor 50 and gear reduction box 52 having an output shaft 54 are employed for imparting reciprocal movement to the above-described unified sets of support platforms. Output shaft 54 of gear box 52 rotatably drives wheel 56 having depending pin 58 eccentrically mounted on an outer peripheral portion thereof. Pin 58 serves as a pivot for one end of a connecting link 60, which is, in turn, pivotally connected at its other end to a pivoting link 62, clearly seen in FIGS. 1 and 2.

Link 62 is pivotally mounted at its center on pivot 64 supported and depending from transverse brace portion 66 of the apparatus frame 13. Link 62 is pivotally connected at its opposite ends to drive links 68 and 70, respectively, and the opposite ends of drive links 68 and 70 are, in turn, pivotally connected to the follower pins 32 of the hand-supporting platforms 18 and 18a, respectively.

Figure 2:
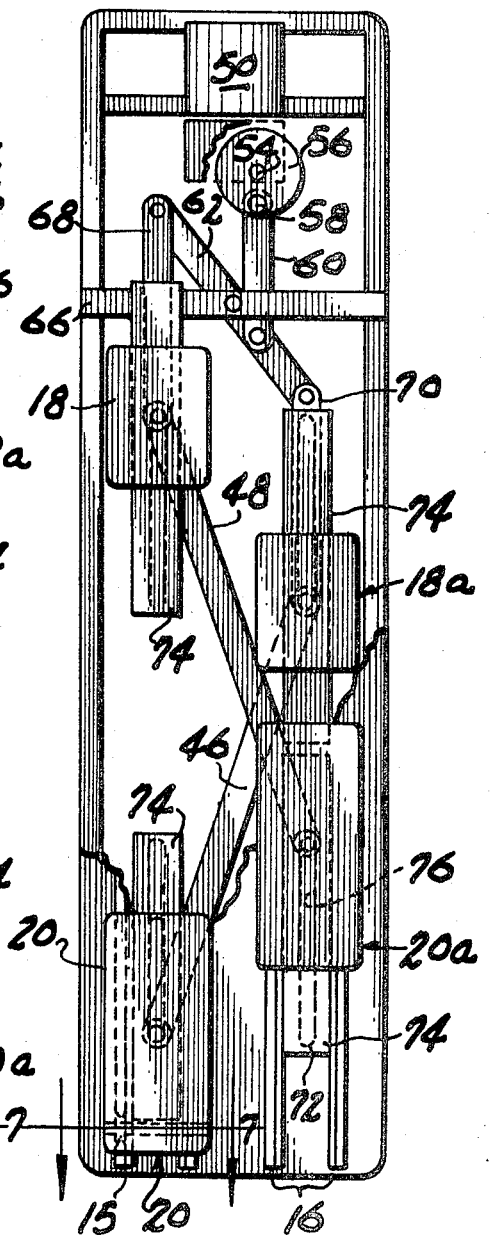
FIG. 2 is a view similar to FIG. 1 illustrating supporting platform members of the teahing aid of FIG. 1 at the other extreme of movement opposite to that illustrated in FIG. 1.

It will be seen from FIGS. 1 and 2 that as the output shaft of motor 50 rotates the disc 56, the eccentrically-mounted pin 58 will drive the pivoting link 62 between the two positions illustrated in FIGS. 1 and 2.

In FIG. 1 the platform members 18 and 20a are driven to their most rearward position, or position furthest from the motor 50, while the unified platform set 18a and 20 is simultaneously driven in the opposite direction to its most forward position. As the disc 56 continues to rotate the eccentric pin 58, the pivotal position of the pivoting link 62 is altered and reversed, whereby the movements of the two unified sets of platforms are reversed into the positions illustrated in FIG. 2.

It will be noted most clearly from FIGS. 3 and 8 that all of the link members employed in transmitting motion from the rotating disc 56 to the four platform members are disposed beneath the upper supporting surface 12 and hidden from view. In order to effect connection between the various links and the depending drive pins 32 of the corresponding platforms, the pins 32 must depend below and traverse the supporting surface 12 of the apparatus 10. Because of such surface passage, four elongate slots 72 must be disposed between the tracks of the two track sets 14 and 16. The slots permit reciprocal movement of the depending pins 32 throughout the course of reciprocal movements effected by the various drive links illustrated.

It will be noted particularly from FIGS. 1 and 2 that the slots 72 through which the pins 32 depend are of substantial length and provide for movement between the two positions illustrated in FIGS. 1 and 2. When the platform members are at various positions in their reciprocal movements illustrated in FIGS. 1 and 2, portions of the pin-receiving slots 72 disposed in the supporting cover 12 of the apparatus 10 would normally be exposed unless precautions were taken to cover the same. If a portion of a slot 72 were left uncovered, a mentally retarded person could inadvertently insert a finger or foot into the slot allowing such member to be injured as the platform members move relative to the supporting upper surface 12.

In order to obviate such an eventuality, slotted shields 74 (seen most clearly in FIGS. 1, 2, 4 and 7) are employed. Each shield 74 has a slot 76 shorter than the underlying slot 72 adapted to be covered thereby and, more importantly, shorter than the associated platforms 18, 18a, 20 or 20a. It will be noted from FIG. 7 that each shield 74 reciprocally moves between the tracks 15 of each track set and is guided thereby. Each shield 74 is positively driven by the corresponding pin 32 when the pin reaches either end of the slot 76 disposed in the shield 74.

In the preferred embodiment, each shield 74 is of greater length than the platform with which it is associated and is so designed that the trailing end of the shield covers the portion of the slot 72 which would be uncovered by the platform with which associated in the normal course of platform movement. Thus, it will be seen from FIG. 1 that the unified platform set 18a and 20, when driven toward motor 50, would normally leave a portion of the slot 72 furthest from the motor 50 uncovered. Similarly, unified platform set 18 and 20a when driven away from the motor 50, as illustrated in FIG. 1, would normally leave the ends of their slots 72 closest to the motor 50 uncovered if the shields 74 were not present to extend over the uncovered slot portions. When reversing direction of movement in the various unified platform pairs, the shields 74 are not moved until the traversing follower pins have traversed the length of the slots 76 in the shields 74 to provide the desired lost motion. Thereafter the shields 74 are positively engaged and again driven by the respective pins 32.

A mentally retarded child or individual, when placed in normal crawling position on the four platform members of the device 10, is forced to simulate a crawling action whereby the right hand and left leg move as a unit in one direction while the left hand and right leg simultaneously move in an opposite direction, thereby simulating a crawling movement.

As above explained, it has been found that such stimulation of the efferent nerves and regulated muscles results in a corresponding stimulation of the mental processes. It should be remembered that the illustrated apparatus has been presented by way of example only.

Lights 77 (illustrated in FIG. 8) may be synchronized to alternately flash with the crawling motion effected by the unified platform pairs. It has been found that such flashing lights will result in eye and head movement as the hands and legs are moved by the supporting platforms, thereby more closely approaching an actual crawling movement.

It will also be noted from FIGS. 3 and 8 that a protective cover 78 is disposed over the motor 50 and gear reduction box 52 and have mounted thereon "stop" and "start" buttons 80, which certain retarded persons may themselves operate in the course of using the apparatus 10. In those instances in which the training device 10 is utilized by persons requiring rather close supervision, a timer may be employed to operate the apparatus for short periods, after which the machine will automatically cease operation, and by which time a supervising attendant may return to remove the individual from the apparatus or restart the apparatus for a new cycle. The illustrated tracks obviously comprise one of a number of guide means for effecting a reciprocal, straight-line movement of the platforms.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. In a teaching aid construction for a person the combination comprising a cover having a top and sides extending downwardly therefrom and having opposed, parallel, axially aligned slots formed in said top, reciprocally movable platform means movable in said top, each being movable over one of said slots and being of such size relative to said slots as to cover only portions thereof during movement, slotted shield means movable over each of the cover slots, guide means for said cover means, said shield means and the slotted portions thereof being of adequate size to cover the underlying slots irrespective of the position of said platform means, depending means connected to each of said platform means, traversing each of said shield means and movable in each of said cover slots; each of said depending means axially moving each of said shield means at the end portions of the platform reciprocal movements whereby said shield means are reciprocally movable.

2. The teaching aid construction of claim 1 in which parallel support means for said platform means straddle each of said cover slots, and each of said shield means is guided by said support means in the course of the shield means reciprocal movement.

3. In a teaching aid construction for a person, the combination comprising a supporting cover having a top and sides defining a cavity, axially aligned pairs of slots in said top, the slot pairs being arranged in parallel relationship; parallel track means adjacent said slots; a pair of platform means having depending portions extending through said cover slots and movable over each of said parallel track means, shield means for each of the slots of said platform means carried by said platform means and overlying said slots, each of said shield means being of adequate length to cover the underlying slot during all movement of the associated platform means, means disposed beneath said cover connecting pairs of platform means which are diagonally disposed in said cover, whereby said pairs are simultaneously moved in opposite directions and a person having his hands and knees supported on said pairs of platform means is forced to simulate a crawling movement.

4. In a teaching aid construction for a person, the combination comprising a supporting cover having opposed, axially-aligned pairs of slots formed in said cover, the slot pairs being arranged in parallel relationship; parallel track means straddling said slot pairs; a pair of platform means having depending pins extending through the cover slots movable over each of said parallel track means; slotted shield means for each of the slots of said platform means receivable between said track means beneath a platform means and having the depending pin of the platform means with which associated transversing the same; each of said shield means being of adequate length to cover the underlying cover slot during all movement of the associated platform means, link means disposed beneath said cover connecting the pins of pairs of platform means which are diagonally disposed on said parallel track means, and means for reciprocally moving each of said diagonally disposed pairs along said track means whereby said pairs are simultaneously moved in opposite directions and a person having his hands and knees supported on said pairs of platform means is forced to simulate a crawling movement.

5. The teaching aid of claim 4 in which said means for reciprocally moving each of said diagonally disposed pairs of platform means comprises a centrally pivoted arm having the pivot thereof disposed intermediate extensions of the longitudinal axes of said track pairs; said pivotal arm being pivotally connected at opposed end limits to drive links also pivotally connected to the depending pins of adjacent platform means of each pair of platform means, eccentric means rotatably moving intermediate extensions of the longitudinal axes of said track pairs; connecting link means driven by said eccentric means and connected to said centrally pivoted arm so as to oscillate said centrally pivoted arm about the pivot thereof whereby reciprocal movement is imparted to said platform means through said drive links.

References Cited

UNITED STATES PATENTS

| | | | |
|---|---|---|---|
| 563,578 | 7/1896 | Emerson | 35—29 X |
| 1,728,103 | 9/1929 | Chaligne. | |
| 2,093,830 | 9/1937 | Flatley | 128—25 |
| 3,140,550 | 7/1964 | Wayfield | 35—29 |
| 3,363,335 | 1/1968 | Burhns et al. | 35—29 |

EUGENE R. CAPOZIO, Primary Examiner

HARLAND S. SKOGQUIST, Assistant Examiner

U.S. Cl. X.R.

74—615; 128—25